United States Patent [19]

Olson

[11] 4,410,594

[45] Oct. 18, 1983

[54] ULTRAVIOLET RADIATION STABILIZED COATED POLYCARBONATE ARTICLE

[75] Inventor: Daniel R. Olson, Schenectady, N.Y.

[73] Assignee: General Electric Company, Pittsfield, Mass.

[21] Appl. No.: 252,872

[22] Filed: Apr. 10, 1981

[51] Int. Cl.³ .................... B32B 27/36; B32B 9/04; B05B 5/00

[52] U.S. Cl. .................... 428/412; 428/447; 428/911; 428/331; 427/160

[58] Field of Search ............ 428/412, 447, 451, 331, 428/911; 427/160, 162

[56] References Cited

U.S. PATENT DOCUMENTS 3,309,220 3/1967 Osteen .................... 427/160
4,284,685 8/1981 Olson et al. .................... 428/412

*Primary Examiner*—George F. Lesmes
*Assistant Examiner*—Beverly K. Johnson
*Attorney, Agent, or Firm*—William F. Mufatti

[57] ABSTRACT

A coated ultraviolet radiation stabilized polycarbonate article having improved abrasion, mar, scratch, and chemical solvent resistance comprising a polycarbonate article with its surface layers impregnated with an ultraviolet radiation absorbing compound having at least one surface thereof coated with (i) an adhesion promoting primer layer comprised of a thermoset acrylic polymer; and (ii) a top coat disposed on said primer layer comprised of a colloidal silica filled thermoset organopolysiloxane.

46 Claims, No Drawings

ULTRAVIOLET RADIATION STABILIZED COATED POLYCARBONATE ARTICLE

This invention relates to a coated and ultraviolet light stabilized polycarbonate article having superior resistance to abrasion, chemical solvents and degradation by ultraviolet light. In the article of the present invention the polycarbonate resin is stabilized against degradation by ultraviolet light by having impregnated in its surface layers an ultraviolet light absorbing compound. Protection against abrasion and chemical solvents is provided by a coating comprised of a colloidal silica filled thermoset organopolysiloxane which is tenaciously and durably adhered to the surface of the polycarbonate resin by means of a primer layer containing a thermoset acrylic polymer.

BACKGROUND OF THE INVENTION

Polycarbonate resins, due to their many advantageous properties, are widely used in industry and commerce. One of their uses is as transparent glazing materials for windows, windshields, and the like. While polycarbonate resins are easily fabricated into the desired shape and have excellent physical and chemical properties, such as being less dense and having greater breakage resistance than glass, they have a relatively low abrasion and chemical solvent resistance, and like many other organic polymeric materials are subject to degradation by ultraviolet radiation.

In order to overcome this relatively low resistance to abrasion and chemical solvents various protective coatings which possess greater abrasion and chemical solvent resistance than polycarbonate resins have been applied onto the surface of polycarbonate articles. However, in order to qualify as a successful coating material for polycarbonate resins there are several requirements that the prospective coating material must meet. The coating material must be harder and more solvent resistant than the polycarbonate resin. The coating material must be compatible with the polycarbonate and must not degrade the polycarbonate such as by crazing the polycarbonate or otherwise adversely affecting the properties of the polycarbonate resin. The coating material must durably adhere to the surface of the polycarbonate. U.S. Pat. Nos. 3,451,838; 3,986,997 and 4,027,073 disclose organopolysiloxane coating compositions and techniques for the application of these organopolysiloxane coatings onto polycarbonate surfaces. While these organopolysiloxane coatings have many desirable properties, e.g., they are hard, abrasion and solvent resistant, and are compatible with the underlying polycarbonate, these organopolysiloxane do not in all instances possess the requisite degree of adhesion to and durability on the polycarbonate. In order to improve the adhesion of these organopolysiloxane coatings to the polycarbonate substrate it has been suggested to use adhesion promoting primer layers between the organopolysiloxane and the polycarbonate. However, the use of a primer layer adds an additional degree of uncertainty and complexity to this already difficult and largely imperical area of coating technology. In order to function effectively the primer layer must not only increase the adhesion of the organopolysiloxane coating to the polycarbonate but must also be compatible with both the polycarbonate and the organopolysiloxane. U.S. Pat. No. 3,707,397 describes a process for providing a hard coating on, inter alia, polycarbonate resin by priming the polycarbonate surface with an adhesion promoting thermosettable acrylic polymer and applying onto this primer a thermosettable organopolysiloxane. An article produced by this process, while processing acceptable initial adhesion of the organopolysiloxane to the polycarbonate, suffers from the disadvantage that upon prolonged exposure to weathering, particularly to sunlight, the organopolysiloxane coating generally tends to lose its initial good adhesion to the polycarbonate resin substrate. Furthermore, the abrasion resistance of the coated article is generally dependent upon the thickness of the thermoset acrylic polymer primer layer. The abrasion resistance of the coated article generally decreases as the thickness of the primer layer increases. The deterioration of the adhesion of the organopolysiloxane coating to the polycarbonate substrate upon exposure to weathering is rectified to a certain degree in articles produced according to the methods disclosed in U.S. Pat. Nos. 4,197,335 and 4,207,357. In the processes disclosed in these two patents the polycarbonate substrate is primed with a primer composition comprising an emulsion of a thermosettable acrylic polymer, water and a hydroxy ether, and the organopolysiloxane containing top coating is then applied onto the primed polycarbonate substrate. However, the abrasion resistance of the coated articles thus produced is still generally dependent on the thickness of the primer layer.

While these prior art methods generally provide a protective coating for the polycarbonate article effective to protect it from abrasion and chemical solvents, they do not provide protection against degradation by ultraviolet radiation. It would appear at first glance in view of the prior art that there are three methods of protecting the coated polycarbonate article from degradation by ultraviolet radiation: (1) incorporating an ultraviolet radiation absorber into the silicone topcoat; (2) Incorporating an ultraviolet radiation absorber into the thermoset acrlic polymer containing primer layer; and (3) incorporating an ultra violet radiation absorber into the polycarbonate resin itself. However, upon closer scrutiny and in light of the mostly empirical knowledge gained in this area each of these three methods turns out to contain certain inherent problems. Incorporating an ultraviolet radiation absorbing compound into the silicone top coat generally results in a decrease in the abrasion resistance provided by the silicone. The greater the amount of ultraviolet radiation absorbing compound present in the silicone top coat, the greater the loss of abrasion resistance provided by the top coat. Thus, if the silicone top coat contains sufficient amounts of ultraviolet radiation absorber to effectively protect the underlying polycarbonate resin from degradation by ultraviolet radiation its abrasion resistance is generally unacceptably lowered. If the ultraviolet radiation absorbing compound is incorporated into the thermoset acrylic polymer containing primer layer the aforediscussed relationship between primer thickness and abrasion resistance of the silicone top coat comes into effect. In order to effectively protect the polycarbonate resin from ultraviolet radiation the primer layer must contain relatively large amounts of ultraviolet radiation absorbing compounds. But in order to contain these relatively large amounts of ultraviolet radiation absorbing compounds the thickness of the primer layer must be increased. However, this increase in thickness of the primer layer which is required to accomodate the necessary amounts of ultraviolet radiation absorbers results in a corresponding decrease in the abrasion resistance of the silicone top coat. Thus in both of these methods protection against ultraviolet radiation is provided only at the expense of protection against abrasion.

The third method of providing protection against ultraviolet radiation involves incorporating the ultraviolet radiation absorbing compound directly into the polycarbonate resin. This method involves either (i) blending the absorber with the bulk polymer, or (ii) impregnating the surface layers of the resin with the absorber. Blending the absorber with the bulk polymer results in the absorber being distributed throughout the entire polymer system. This procedure is both uneconomical, as these ultraviolet radiation absorbing compounds are usually quite expensive, and not completely successful. Since most of the absorber resides in the polymer's interior instead of at the surface where it is most needed, much of the harmful ultraviolet radiation penetrates and deteriorates the surface layers of the polymer structure before reaching the majority of the interiorly distributed absorber. Furthermore, since the concentration of the absorber in the resin is limited by the degree of compatibility of the absorber with the resin, using sufficiently high concentrations of absorber effective to provide adequate surface protection generally tends to adversely affect the physical properties of the polymer. In the surface impregnation technique the ultraviolet radiation absorber resides in the surface regions of the polymer where it is most needed. Examples of typical surface impregnation techniques generally include applying the ultraviolet radiation absorber from a stabilizing solution containing a compound which is aggressive towards the polycarbonate and tends to swell or soften the resin thus enabling the absorber to diffuse into the swelled and softened surface of the polycarbonate layer, as disclosed in U.S. Pat. Nos. 3,892,889 and 4,146,658; melting the ultraviolet radiation absorber on the surface of the polycarbonate resin and allowing the molten absorber to diffuse into the surface layers of the resin, as disclosed in U.S. Pat. No. 3,043,709; and immersing the polycarbonate resin in a stabilizing solution containing an ultraviolet radiation absorbing compound wherein the compound is more soluble in the polycarbonate resin than in the stabilizing solution, as disclosed in U.S. Pat. Nos. 3,309,220 and 3,594,264.

However, the very feature which makes the surface impregnation method appear attractive, i.e., that the ultraviolet radiation absorber is distributed in the surface layers of the polycarbonate resin where it is most needed, also makes this method appear to be untenable to one skilled in the art when this method is used in conjunction with the application of a protective coating onto the polycarbonate surface. The complexity and problems associated with providing a protective coating which adheres tenaciously and durably to a polycarbonate surface have been discussed above. The modification of a polycarbonate surface by incorporating therein an ultraviolet radiation absorber, as is done by the surface impregnation technique, adds yet further complications to this already complex area of adhering protective coatings to polycarbonate. It is well known to those skilled in the coating art that modifying the surface of polycarbonate by incorporating an additive therein has generally unpredictable and often adverse effects upon the physical properties of the polycarbonate surface. These effects upon the polycarbonate surface depend upon the particular additive employed. It is generally quite well known that the incorporation of certain additives into the surface areas of polycarbonate resin often results in the deterioration of both initial adhesion and durability of adhesion between the polycarbonate surface and a protective coating applied onto this surface. In view of this one skilled in the art would generally be led to conclude that the incorporation in the surface layers of a polycarbonate resin of an amount of ultraviolet radiation absorbing compound effective to protect the polycarbonate from degradation by ultraviolet radiation would deleteriously affect the adhesion of a protective coating to this modified polycarbonate surface.

There thus exists a need for a means of simply and effectively protecting a polycarbonate resin from degradation by ultraviolet radiation, from surface abrasion, and from attack by chemical solvents. The present invention provides such a method as well as the article produced by this method.

DESCRIPTION OF THE INVENTION

In accordance with the present invention there is provided a polycarbonate article which is resistant to degradation by ultraviolet radiation, abrasion, and chemical solvents. The article of the present invention comprises a polycarbonate article having impregnated in its surface layers at least one ultraviolet radiation absorbing compound and having adhered to at least one surface thereof (i) a thermoset acrylic polymer containing primer layer, and (ii) on said primer layer a top coat comprised of a colloidal silica filled thermoset organopolysiloxane.

In accordance with the present invention an article comprised of polycarbonate is formed in a conventional manner, for example by injection molding, extrusion, cold forming, vacuum forming, below moulding, compression molding, transfer molding, and the like. The article may be in any shape and need not be a finished article of commerce, that is, it may be sheet material or film which would be cut or sized or mechanically shaped into a finished article. Therefore, as used herein, the term "article" refers to any shape or form of polycarbonate resin whether finished or stock material.

The aromatic carbonate polymers used in the practice of the instant invention have recurring structural units of the formula

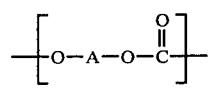   I.

where A is a divalent aromatic radical of the dihydric phenol employed in the polymer producing reaction. These polycarbonate resins are high molecular weight aromatic carbonate polymers which may be prepared by reacting a dihydric phenol with a carbonate precursor such as phosgene, a haloformate or a carbonate ester.

The aromatic carbonate polymers of this invention may be prepared by methods well known in the art and described in U.S. Pat. Nos. 3,161,615; 3,220,973; 3,312,659; 3,312,660; 3,313,777; 3,666,614; and 3,989,672 all of which are incorporated herein by reference.

Also included herein are branched polycarbonates wherein a polyfunctional aromatic compound is reacted with the dihydric phenol and the carbonate precursor to provide a thermoplastic randomly branched polycarbonate wherein the recurring units of formula I contain branching groups.

The preferred polycarbonate resin is one which may be derived from the reaction of bisphenol-A with phosgene. These preferred polycarbonates have from about 10 to about 400 recurring structural units of the general formula

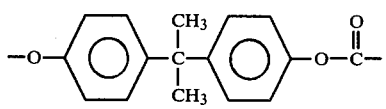

The polycarbonate should preferably have an intrinsic viscosity between about 0.3 and about 0.1, more preferably from between about 0.4 to about 0.65 as measured at 25° C. in methylene chloride.

At least one surface of the polycarbonate article, usually the surface which is to be exposed to the source of ultraviolet radiation, is impregnated with at least one ultraviolet radiation absorbing compound. The ultraviolet radiation absorber is disposed throughout the surface layers of the polycarbonate article. By surface layers is meant the layers immediately adjacent to and below the surface of the polycarbonate article, and including the surface itself.

The ultraviolet radiation absorbers employed in the practice of this invention can be any of the known ultraviolet radiation absorbing compounds which function by reason of their ability to screen out the damaging ultraviolet portion of light due to their very high absorptivity in this region of the spectrum. These compounds include benzophenone and the benzophenone derivatives, benzotriazole and benzotriazole derivatives, benzoate esters, phenyl salicylates, derivatives of crotonic acid, malonic acid esters, and cyanoacrylates.

Included among the ultraviolet radiation absorbers which fall into the categories of benzophenone and benzotriazole derivatives are those compounds disclosed in U.S. Pat. Nos. 3,309,220; 3,049,443; 3,043,709; and 2,976,259, all of which are herein incorporated by reference. Some non-limiting examples of these compounds include:

2,2'-dihydroxybenzophenone;
2,2',4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methyoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiarybutylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4,'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone;
2-(2'-hydroxy-5'-methylphenyl)-benzotriazole;
2-(2'-hydroxy-5'-tert-butylphenyl)-benzotriazole;
2-(2'-hydroxy-3'-methyl-5'-tert-butylphenyl)-benzotriazole;
2-(2'-hydroxy-5'-cyclohexylphenyl)-benzotriazole;
2-(2'-hydroxy-3',5'-dimethylphenyl)-benzotriazole;
2-(2'-hydroxy-5'-tert-butylphenyl)-5-chlorobenzotriazole; and
2-(2'-hydroxy-3'-di-tert-butylphenyl)-benzotriazole.

Two non-limiting examples of the derivatives of crotonic acid which function as ultraviolet radiation absorbers are alpha-cyano-beta-methyl-beta-(p-methoxyphenyl)-crotonic acid methyl ester and alpha-cyano-beta-N-(2-methyl-indolinyl)-crotonic acid methyl ester. The benzoate ester ultraviolet radiation absorbing compounds include the $C_8$–$C_{20}$ alkyl and aryl benzoates, alkyl and aryl hydroxybenzoate, alkaryl and aralkyl benzoates, and alkaryl and aralkyl hydroxybenzoates.

The malonic acid esters which are ultraviolet radiation absorbing compounds include the dimethyl, diethyl, dipropyl and the like esters of malonic acid, i.e., the dialkyl esters of malonic acid. Particularly useful esters of malonic acid are the benzylidene malonates. The benzylidene malonates are compounds represented by the general formula

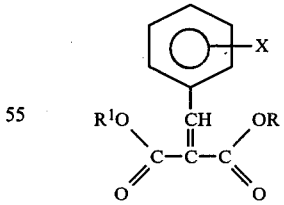

wherein X is selected from hydrogen, hydroxyl, halogen, alkyl, preferably $C_1$–$C_{10}$ alkyl, and alkoxy, preferably $C_1$–$C_{10}$ alkoxy, radicals; and R and $R^1$ are independently selected from alkyl radicals, preferably alkyl radicals containing from 1 to about 10 carbon atoms, substituted alkyl radicals, preferably those containing from 1 to about 10 carbon atoms and hydroxyl or halogen substituents, aryl radicals, preferably the phenyl radical, alkaryl radicals, preferably those alkaryl radicals containing from about 7 to about 12 carbon atoms, aralkyl radicals, preferably aralkyl radicals containing from about 7 to about 12 carbon atoms, and substituted aryl radicals, preferably phenyl radicals containing hydroxyl or halogen substituents. Preferred benzlidene malonates represented by formula III are those wherein X represents an alkoxy group and R and $R^1$ are independently selected from alkyl radicals. Examples of these benzylidene malonates include diethyl paramethoxybenzylidene malonate and dimethyl paramethoxybenzylidene malonate.

Among the cyanoacrylates which are useful ultraviolet radiation absorbers are those cyanoacrylates represented by the general formula

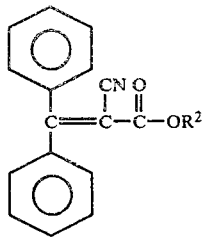

IV.

wherein $R^2$ is alkyl or hydroxyalkyl. These compounds are disclosed in U.S. Pat. No. 4,129,667 which is incorporated herein by reference.

The preferred ultraviolet radiation absorbing compounds, for the purposes of the present invention, are the benzophenone and benzophenone derivatives, benzotriazole and benzotriazole derivatives, the benzylidene malonates, and the cyanoacrylates.

The amount of ultraviolet radiation absorbing compound present in the surface layers of the polycarbonate resin is an amount effective to protect the polycarbonate resin against degradation by ultraviolet radiation. Only one ultraviolet radiation absorbing compound may be present in the surface layers of the polycarbonate resin or two or more ultraviolet radiation absorbing compounds may be impregnated in the surface layers. Generally, a sufficient amount of ultraviolet radiation absorbing compound is present in the surface layers of the polycarbonate resin article so that the absorbance of the polycarbonate at λmaximum is at least 1, which corresponds to absorption at λmaximum of at least 90% of the incident ultraviolet radiation by the polycarbonate surface layers. The absorbance is calculated using the relationship $A = \log (I_o/I)$ wherein A is the absorbance, $I_o$ is the intensity of incident light, and I is the intensity of transmitted light.

The ultraviolet radiation absorbing compound can be impregnated into the surface layers of the polycarbonate resin article by any of several known methods. One of these methods involves applying the ultraviolet radiation absorber from a solution containing the ultraviolet radiation absorber and a compound which is aggressive towards the polycarbonate resin and tends to swell and/or soften the resin thus allowing the ultraviolet radiation absorber to diffuse into the softened and/or swelled surface of the polycarbonate. In this method the solution containing the ultraviolet radiation absorber and the aggressive compound is brought into contact with the surface of the polycarbonate resin article and is kept in contact therewith for a period of time effective for the aggressive compound to swell the surface layers of the polycarbonate and for the ultraviolet radiation absorbing compound to diffuse into these swelled surface layers. Some specific examples of this type of technique are described in U.S. Pat. Nos. 3,617,330; 3,892,889; and 4,146,658.

Another method of impregnating the surface layers of polycarbonate resin with ultraviolet radiation absorbing compounds involves applying the ultraviolet light absorber to the surface of the resin article, as for example from a solution, from a dispersion such as a dispersion in water, as a solid in the form of a powder or dust, or as a liquid in the form of a melt, and thereafter heating the coated resin to a temperature above the melting point of the absorber and below the melting point of the resin.

Yet another method of surface impregnating a polycarbonate resin with an ultraviolet radiation absorbing compound involves immersing a polycarbonate resin article in a bath containing an ultraviolet radiation absorbing compound which is more soluble in the polycarbonate resin than in the solvent component of the bath. Generally, the solvent component of the bath is water or oil. This method of impregnating the surface layers of a polycarbonate resin with an ultraviolet radiation absorbing compound is disclosed in U.S. Pat. Nos. 3,309,220 and 3,594,264.

Still another method, and one which is generally preferred, of impregnating the surface layers of a polycarbonate resin article with an ultraviolet radiation absorbing compound involves the ultilization of a stabilizing composition containing an ultraviolet radiation absorbing compound and a nonaggressive liquid carrier for said compound. By nonaggressive is meant that the liquid carrier is nonaggressive towards the polycarbonate resin, i.e., it does not attack and/or deleteriously affect the polycarbonate resin. Since a nonaggressive stabilizing composition is used there is no degradation or adverse effect on the polycarbonate resin. Furthermore, since the stabilizing composition is nonaggressive towards the polycarbonate the processing step does not need to be as rigidly controlled, with respect to the residence time of the stabilizing composition on the surface of the polycarbonate resin, as in the case of an aggressive stabilizing composition.

There are basically two ways of practicing this method. In the first way a stabilizing composition containing the ultraviolet radiation absorber and the nonaggressive liquid carrier therefore is applied onto the surface of a preheated polycarbonate article by any of several known methods such as spraying, flow coating, brushing, and the like. The stabilizing composition is kept in contact with the preheated polycarbonate resin article for a period of time sufficient for the ultraviolet radiation absorber to effectively impregnate the surface layers of the polycarbonate article, that is for the ultraviolet radiation absorber to diffuse throughout the surface layers of the polycarbonate article in concentrations sufficient to provide protection against the deleterious effects of ultraviolet radiation. Since the stabilizing composition is nonaggressive towards the polycarbonate there is no upper time limit that the composition can remain in contact with the polycarbonate. Rather, the residence time of the stabilizing composition on the surface of the polycarbonate resin article is governed by such secondary considerations as speed of processing of the polycarbonate article, rate of cooling of the polycarbonate—if the polycarbonate resin cools below the critical temperature no further diffusion of the absorber into the surface layers of the resin will take place—rate of evaporation of the liquid carrier, and the like. The minimum period of time that the stabilizing composition is kept in contact with the polycarbonate article is the period of time which is sufficient for the ultraviolet radiation absorber to impregnate the surface layers of the resin article in concentrations effective to protect the polycarbonate resin against degradation by ultraviolet radiation. This minimum period generally depends to a certain degree upon the particular ultraviolet radiation absorber present in the stabilizing composition, the particular liquid carrier present in the stabilizing composition, and the temperature to which the polycarbonate article has been preheated. Generally, the stabilizing composition is kept in contact with the polycarbonate article from about 5 seconds to about 2 hours, preferably from about 30 seconds to about 15 minutes.

It is critical to the practice of this process that the polycarbonate resin article be at a temperature sufficiently high when the stabilizing composition is contacted therewith for the ultraviolet radiation absorber to impregnate the surface layers thereof in concentrations effective to provide protection against degradation of the polycarbonate by ultraviolet radiation. If the polycarbonate is not at a temperature effective for the impregnation of the absorber into the polycarbonate surface layers when the stabilizing composition is applied onto the surface of the polycarbonate resin article the ultraviolet radiation absorber will not diffuse into or impregnate the surface layers of the polycarbonate and, consequently, the polycarbonate will not be protected against degradation by ultraviolet radiation. Generally, the minimum temperature at which impregnation of the surface layers of the polycarbonate resin article by the ultraviolet radiation absorber takes place is about 65° C. Preferably the polycarbonate resin article should be at about at least 75° C. as at this temperature and above the ultraviolet radiation absorber generally diffuses readily and in large amounts into the surface layers of the polycarbonate resin. The maximum temperature to which the polycarbonate resin is preheated, and the maximum temperature of the polycarbonate resin at the time that the stabilizing composition is applied onto the surface of the polycarbonate resin article, is governed by the fact that the temperature of the polycarbonate be not sufficiently high so as to deleteriously affect the physical properties of the polycarbonate resin. Thus the upper temperature limit is below about 150° C. which is the glass transition temperature of the polycarbonate. Preferably it should be below about 135° C., the temperature at which bubbles and other imperfections begin to appear in the polycarbonate resin.

Thus in the practice of this method the polycarbonate resin article should be at a temperature between about 65° C. and about 150° C. during contact with the stabilizing composition. For optimum results and optimum operating conditions the polycarbonate article should preferably be at a temperature between about 75° C. and about 135° C. The polycarbonate article is preheated to this temperature before the stabilizing composition is brought into contact with the surface thereof. There is no active heating of the polycarbonate article during the period that the stabilizing composition is in contact with the surface of the resin article. The stabilizing composition is not heated but is generally at about room temperature at the time of its application onto the surface of the preheated polycarbonate resin article.

The second technique involving the utilization of a stabilizing composition containing an ultraviolet radiation absorber and a nonaggressive liquid carrier therefore comprises applying onto the surface of a polycarbonate resin article the stabilizing composition and thereafter heating the polycarbonate article having a layer of the stabilizing composition on its surface to a temperature effective for the ultraviolet radiation absorber to diffuse into the surface layers of the polycarbonate article. Heating at the effective temperature is continued and the stabilizing composition is kept in contact with the surface of the article at the effective temperature for a period of time sufficient for the ultraviolet radiation absorber to effectively impregnate the surface layers of the polycarbonate article, i.e., for the ultraviolet radiation absorber to diffuse throughout the surface layers of the polycarbonate resin article in concentrations sufficient to provide protection against the deleterious effects of ultraviolet light. Since the stabilizing composition is nonaggressive towards polycarbonate there is no upper time limit that the composition can remain in contact with the polycarbonate resin article during heating at the effective temperature. The minimum period of time that the stabilizing composition is kept in contact with the surface of the article at the effective temperature is that period of time which is sufficient for the absorber to impregnate the surface layers of the polycarbonate resin article in concentrations effective to provide protection to the polycarbonate resin against degradation by ultraviolet radiation. This minimum period of time generally depends to a certain degree upon the particular ultraviolet radiation absorber employed, the particular nonaggressive liquid carrier utilized, and the temperature at which the coated polycarbonate article is heated. Generally, the article with the stabilizing composition on its surface is actively heated for a period of time ranging from about 5 seconds to about 2 hours, preferably from about 30 seconds to about 30 minutes.

As in the technique wherein the stabilizing composition is applied onto a preheated polycarbonate surface, so also in this technique it is critical that the polycarbonate article with the stabilizing composition on its surface be heated to a temperature suuficiently high for the ultraviolet radiation absorber to impregnate the surface layers of the article in concentrations effective to provide protection against ultraviolet radiation but insufficiently high for degradation of the polycarbonate resin to occur. Generally, the minimum temperature at which effective impregnation of the surface layers of the polycarbonate resin article takes place is at about 65° C. Preferably the polycarbonate resin article with a layer of the stabilizing composition disposed on its surface is heated to at least about 75° C., as at this temperature and above the ultraviolet radiation absorber generally diffuses readily and in large amounts into the surface layers of the polycarbonate resin. The maximum temperature to which the polycarbonate article coated with the stabilizing composition can be heated is governed by the fact that this temperature be not sufficiently high so as to deleteriously affect the physical properties of the polycarbonate resin, i.e., that heat degradation of the polycarbonate resin not occur. Thus the upper temperature limit is below about 150° C. which is the glass transition temperature of polycarbonate resin. Preferably the temperature should be below about 135° C., the point at which bubbles and other imperfections begin to appear in the resin.

In both of these techniques utilizing a nonaggressive stabilizing composition the nonaggressive liquid carrier for the ultraviolet radiation absorber is selected from the group consisting of hydroxy ethers, alcohols, preferably the alkanols, alcohol-water mixtures, preferably alkanol-water mixtures, liquid aliphaic hydrocarbons, preferably liquid saturated aliphatic hydrocarbons, liquid cycloaliphatic hydrocarbons, preferably liquid saturated cycloaliphatic hydrocarbons, and chlorofluorocarbons such as those marketed by the E. I. duPont Company under the tradename Freon, e.g., dichlorodifluoromethane, trichloromonofluoromethane, and the like.

The stabilizing compositions contain from about 0.01 to about 15 weight percent of an ultraviolet radiation absorbing compound, preferably from about 0.1 to about 10 weight percent of an ultraviolet radiation absorber, and more preferably from about 1 to about 8 weight percent of an ultraviolet radiation absorber. The stabilizing compositions may contain only one ultraviolet radiation absorber or a combination of two or more ultraviolet radiation absorbers. If two or more ultraviolet radiation absorbing compounds are present in the stabilizing compositions their combined weight percentages generaly range from from about 0.01 to about 15 weight percent of the stabilizing composition. These amounts are generally amounts effective to provide protection from degradation by ultraviolet radiation to the polycarbonate resin article.

On the surface of the polycarbonae resin article with its surface layers impregnated with at least one ultraviolet radiation absorbing compound is adherently disposed a primer layer comprised of a thermoset acrylic polymer. The thermoset acrylic polymer of the primer layer is obtained from the thermosetting of a thermosettable acrylic polymer which is applied onto the surface of the ultraviolet radiation stabilized polycarbonate resin article from a primer composition containing this thermosettable acrylic polymer. The thermosettable acrylic polymers are compounds well known in the art. Exemplary, nonlimiting, thermosettable acrylics which may be employed in the practice of this invention are disclosed, for example, in *Encyclopedia of Polymer Science and Technology,* Vol. 1, Interscience Publishers, John Wiley & Sons, Inc., 1964, at page 273 et seq., and in *Chemistry of Organic Film Formers,* by D. H. Solomon, John Wiley & Sons, Inc., 1967, at page 251 et seq., and the references cited therein, all of which are incorporated herein by reference.

These thermosettable acrylic polymers generally include: (I) acrylic copolymers having reactive functional groups which are capable of reacting between themselves to effect a cross-linkage thereof; (II) acrylic copolymers having reactive functional groups to which there is added an appropriate cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether groups; carboxyl functional groups and N-methylol or N-methylol-ether functional groups; interreaction between carboxyl and isocyanate groups; reactions between hydroxyl, for example polyols, and isocyanate groups; and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 weight percent of the monomer mass which is polymerized. Some non-limiting examples of these functional group supplying monomers include glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$-$C_3$) alkyl acrylic ester or mixtures thereof, e.g., methyl acrylate, ethyl acrylate, methyl methacrylate, ethyl methacrylate, styrene, or mixtures thereof, in an amount ranging between about 75 parts by weight to about 99 parts by weight and, more typically, between about 80 parts by weight to about 97 parts by weight.

The primer compositions useful in applying the thermosettable acrylic polymer onto the surface of the ultraviolet radiation stabilized polycarbonate may be of several general types. The first type of primer composition contains the thermosettable acrylic polymer and a solvent for said polymer. This solvent is generally an organic solvent which dissolves the thermosettable acrylic polymer, which is inert towards the ultraviolet radiation stabilized polycarbonate resin, and which is readily volatilized. Some nonlimiting examples of such solvents include the hydroxyethers, alcohols, liquid aliphatic hydrocarbons, and liquid cycloaliphatic hydrocarbons.

A second type of primer composition is one generally comprised of an emulsion of a thermosettable acrylic polymer and water. These emulsions are commercially available and are sold, for example, by the Rohm & Haas Company, of Philadelphia, Pa., under the tradename Rhoplex. Generally, these emulsions are in the form of emulsion concentrates which contain from about 40 to about 55 percent by weight solids. However, in formulating the primer emulsion compositions it is desirable that the primer emulsion composition contain from about 1 to about 10 weight percent solids. Thus it is generally necessary to dilute these commercially available emulsion concentrates by the addition of additional water thereto. These primer emulsion compositions may additionally contain a curing catalyst for the thermosettable acrylic polymer. If such a catalyst is present it may be present in from about 0.05 to about 2 weight percent based on the weight of the thermosettable acrylic polymer solids present. Examples of such catalysts include toluene sulfonic acid, citric acid, phosphoric acid, and the like.

A third and preferred type, from the standpoint of providing a coated article with superior appearance and adhesion of the top coat, primer composition is an emulsion comprised of (i) from about 1 to about 10 weight percent of a thermosettable acrylic polymer solids; (ii) from about 20 to about 45 weight percent of a hydroxy ether, an alkanol, or a mixture of a hydroxy ether and an alkanol; and (iii) from about 45 to about 79 weight percent of water.

In this preferred type of primer composition the thermosettable acrylic polymer, as is the case with the commercially available emulsions described above, is generally in the form of discrete spherical particles (approximately 0.1 micron in diameter) dispersed in water. Since the polymer particles are separate from the continuous aqueous phase, the viscosity of the dispersion or emulsion is relatively independent of the polymer's molecular weight. Consequently the emulsion can contain polymers of high molecular weight and yet have a relatively low viscosity. The concentration of the acrylic polymer solids in this preferred primer emulsion composition is generally quite important. Organopolysiloxane top coats applied onto thermoset acrylic primer layers derived from primer emulsion compositions containing less than about 1 or more than about 10 weight percent of a thermosettable acrylic polymer generally tend to exhibit a marked decrease in durability of adhesion, especially after exposure to weathering, and abrasion resistance relative to organopolysiloxane top coats applied onto thermoset acrylic primer layers derived from primer emulsion compositions containing from about 1 to about 10 weight percent of a thermosettable acrylic polymer. Primer emulsion compositions containing from about 2 to about 6 weight percent of a thermosettable acrylic polymer are preferred.

The hydroxy ethers which are present in these preferred primer emulsion compositions are compounds represented by the general formula

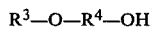   V.

wherein R⁴ is a saturated divalent aliphatic radical, preferably one containing from 1 to about 6 carbon atoms, and R³ is an alkyl radical or an alkoxy alkyl radical containing from 1 to about 6 carbon atoms.

The alkanols that may be present in this preferred primer emulsion composition are those containing from 1 to about 4 carbon atoms.

The presence of these afore-described hydroxy ethers, alkanols, or hydroxy ether-alkanol mixtures in amounts of from about 20 to about 45 weight percent of the primer emulsion composition is very important to the satisfactory performance of the primer emulsion composition in forming an effective primer layer. If no hydroxy ether or alkanol is present, or if an amount of hydroxy ether or alkanol less than about 20 weight percent is present, the primer emulsion composition does not generally flow evenly over the polycarbonate substrate, i.e., there is uneven distribution of the primer emulsion composition over the substrate with excessive concentrations of the composition in certain areas and a dearth of the composition in other areas. This results in an unevenly distributed and non-uniform primer layer being formed which in turn results in inferior adhesion of the silicone top coat, and in a streaked appearance of the final coated product. If too much hydroxy ether or alkanol is present, i.e., amounts greater than about 45 weight percent, coagulation and precipitation of the thermosettable acrylic polymer solids generally occurs.

This preferred primer emulsion composition may also contain, when needed, a curing catalyst for the thermosettable acrylic polymer. If such a catalyst is present it is usually present in from about 0.05 to about 2 weight percent based on the weight of the thermosettable acrylic polymer solids. Examples of such catalysts include toluene sulfonic acid, citric acid, phosphoric acid, and the like.

All three of the aforedescribed primer compositions are generally applied onto the surface of the ultraviolet radiation stabilized polycarbonate resin article in substantially the same way, and after application are subjected to generally the same procedure to produce the solid thermoset acrylic polymer containing primer layer. A thin layer of the primer composition is applied onto the surface of the polycarbonate substrate by any of the well known methods such as spraying, dipping, flow-coating, roll-coating and the like. Generally the primer composition is applied in an amount sufficient to provide a cured primer layer of from about 0.01 to about 0.1 mil thick, and preferably from about 0.02 to about 0.08 mil thick. After the primer composition has been applied onto the polycarbonate surface a substantial portion of the volatile liquids present in the primer composition, e.g., the organic solvents in the first type of primer composition, the water in the second type of primer emulsion composition, and the water and hydroxy ether or alkanol in the preferred type of primer emulsion composition, are evaporated off. This evaporation is accomplished by air drying or mild heating. The evaporation of a substantial portion, if not all, of the liquid component of the primer composition leaves deposited on the substrate surface an even and generally solid layer comprised of a thermosettable acrylic polymer. This thermosettable acrylic polymer is then cured or thermoset (cross-linked) by heating at a temperature effective to cure the thermosettable acrylic polymer to a thermoset acrylic polymer. Generally this temperature ranges from about 90° C. to about 130° C. The end result of this procedure is a solid primer layer comprised of a thermoset acrylic polymer durably and tenaciously adhered to the surface of the ultraviolet radiation stabilized polycarbonate resin article surface.

This thermoset acrylic polymer containing primer layer acts to promote the adhesion of the colloidal silica filled thermoset organopolysiloxane containing top coat, which is disposed on the outer surface of said primer layer, to the underlying surface of the polycarbonate substrate. In the practice of this invention a top coat composition comprising a colloidal silica filled further curable organopolysiloxane is applied onto the surface of the cured primer layer and the organopolysiloxane is then cured to form a top coat containing a colloidal silica filled thermoset organopolysiloxane.

One type of colloidal silica filled further curable organopolysiloxane composition useful as the top coat composition in the practice of the present invention is that described in U.S. Pat. Nos. 3,986,997 and 4,027,073 and comprises a dispersion of colloidal silica in a lower aliphatic alcohol-water solution of the partial condensate of a silanol having the formula

   VI.

wherein R⁵ is selected from the group consisting of alkyl radicals containing from 1 to about 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is preferably obtained entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxypropyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica filled organopolysiloxane composition and to obtain the optimum properties in the cured coating obtained from this composition. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of this composition is generated in situ by the addition of the corresponding trialkoxysilanes to aqueous dispersions of colloidal silica. Suitable trialkoxysilanes are those containing methoxy, ethoxy, propoxy, isopropoxy and sec-butoxy substituents. Upon generation of the silanol in the acidic aqueous medium there is condensation of the hydroxyl substituents to form —Si—O—Si— bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During curing of the top coat composition, which has been applied as a thin layer onto the surface of the primer layer further condensation of the uncondensed silanol groups occurs resulting in the formation of a substantially fully condensed thermoset (cross-linked) colloidal silica filled organopolysiloxane.

The silica component of the top coat composition is present in the form of colloidal silica. Aqueous colloidal silica dispersions generally have a particle size in the range of from about 5 to about 150 millimicrons in diameter. These silica dispersions are prepared by methods well known in the art and are commercially available. It is preferred to use colloidal silica having a particle size in the range of from about 10 to about 30 millimicrons in diameter in order to obtain dispersions having a greater stability and to provide top coatings having superior optical properties.

The silica filled further curable organopolysiloxane top coat compositions are prepared by adding trialkoxysilanes to colloidal silica hydrosol and adjusting the pH to a range of between 3.0 and 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, tert-butanol, and mixtures thereof. Generally, the solvent system should contain from about 20 to about 75 weight percent alcohol to ensure solubility of the siloxanol formed by the condensation of the silanol. If desired, a minor amount of an additional water miscible polar solvent such as acetone, butyl Cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol. This condensation occurs upon the generation of the silanol in the acidic aqueous medium through the hydroxyl groups to form —Si—O—Si— bonding. The condensation is not complete, resulting in a siloxane having an appreciable amount of silicon-bonded hydroxyl groups. This aged, colloidal silica filled further curable organopolysiloxane top coat composition is then applied onto the primed polycarbonate surface by any of the commonly known methods such as dipping, spraying, flow-coating and the like. After the top coat composition has been applied onto the primed polycarbonate surface a substantial amount of the volatile solvents present in the top coat composition are evaporated off by either air drying or mild heating. After evaporation of a substantial portion of the solvents from the top coat composition there is left on the surface of the primer layer a generally solid layer comprised of a colloidal silica filled further curable organopolysiloxane. Heat is then applied to this further curable organopolysiloxane to effectuate further condensation of the silanols and cross-linking of the polymer. The result is a colloidal silica filled thermoset organopolysiloxane top coat which is highly resistant to scratching, abrasion, marring, and organic solvents, and which is tenaciously and durably adhered, by means of the adhesion promoting primer layer, to the ultraviolet radiation stabilized polycarbonate surface. Generally, this top coat contains from about 10 to about 70 weight percent of colloidal silica and from about 30 to about 70 weight percent of organopolysiloxane.

The thickness of the cured top coat is generally dependent upon the method of application and upon the weight percent solids present in the top coat composition. In general, the higher the weight percent solids present in the top coat composition, and the longer the application or residence time of the top coat composition on the primed polycarbonate surface, the greater the thickness of the cured top coat. Preferably the cured top coat has a thickness of from about 0.1 to about 0.7 mils, more preferably from about 0.15 to about 0.5 mils, and most preferably from about 0.2 to about 0.3 mils.

DESCRIPTION OF THE PREFERRED EMBODIMENT

In order to more fully and clearly illustrate the present invention the following specific examples are presented. It is intended that the examples be considered as illustrative rather than limiting the invention disclosed and claimed herein. In the examples, all parts are percentages are on a weight basis unless otherwise specified.

EXAMPLE 1

The surface layers of polycarbonate test panels 4"×4"×¼" are impregnated with an ultraviolet radiation absorbing compound by flow coating the panels with an ultraviolet radiation stabilizing composition comprised of a solution of 1% Cyasorb UV-1988 (a benzylidene malonate ultraviolet radiation absorber marketed by the American Cyanamid Co., and represented by general Formula III wherein X is the $OCH_3$ radical and R and $R^1$ are methyl radicals) dissolved in butoxyethanol. The coated panels are drained for less than one minute and are then heated at 125° C. for five minutes to surface impregnate the panels.

A primer layer containing a thermoset acrylic polymer is applied onto these ultraviolet radiation stabilized polycarbonate panels by flow coating the panels with a primer emulsion composition containing 10% of thermosettable acrylic solids containing 0.3% toluene sulfonic acid (these solids are provided by Rhoplex AC-658, a commercially available thermosetting acrylic polymer containing emulsion containing from about 46 to 48 percent total solids, which is marketed by the Rohm & Haas Company), 35% butoxyethanol and 65% water. The test panels are drained for 15 minutes and are then heated for one hour at 125° C. to cure the thermosettable acrylic polymer to a thermoset acrylic polymer.

A colloidal silica filled thermoset organopolysiloxane top coat is applied onto the primed test panels by flow coating the primed panels with a top coat composition containing about 18% solids, about 50% of these solids being colloidal silica and about 50% of these solids being the partial condensation product of $CH_3SI(OH)_3$, in a lower aliphatic alcohol-water system, and having a pH of about 3.9. The panels coated with this top coat composition are drained for thirty minutes and are then baked at 125° C. for one hour to cure the organopolysiloxane to the thermoset stage.

EXAMPLE 2

Ultraviolet radiation stabilized, primed and top coated polycarbonate test panels are prepared substantially in accordance with the procedure of Example 1 except that the ultraviolet radiation stabilizing composition contains 2% of Cyasorb UV-1988 ultraviolet radiation absorbing compound.

EXAMPLE 3

Ultraviolet radiation stabilized, primed and top coated polycarbonate test panels are prepared substantially in accordance with the procedure of Example 1 except that the ultraviolet radiation stabilizing composition contains 3% of Cyasorb UV-1988 ultraviolet radiation absorber.

EXAMPLE 4

Ultraviolet radiation stabilized, primed and top coated polycarbonate test panels are prepared substantially in accordance with the procedure of Example 1 except that the ultraviolet radiation stabilizing composition contains 1% of 2,2',4,4'-tetrahydroxybenzophenone ultraviolet radiation absorber.

EXAMPLE 5

Ultraviolet radiation stabilized, primed and top coated polycarbonate test panels are prepared substantially in accordance with the procedure of Example 1 except that the ultraviolet radiation stabilizing composition contains 2% of 2,2',4,4'-tetrahydroxybenzophenone ultraviolet radiation absorber.

EXAMPLE 6

Ultraviolet radiation stabilized, primed and top coated polycarbonate test panels are prepared substantially in accordance with the procedure of Example 1 except that the ultraviolet radiation stabilizing composition contains 3% of 2,2',4,4'-tetrahydroxybenzophenone ultraviolet radiation absorber.

EXAMPLE 7

This example is illustrative of a prior art primed and top coated, but not ultraviolet radiation stabilized, polycarbonate resin article falling outside the scope of the present invention. The surface layers of polycarbonate test panels 4"×4"×¼" are primed with a thermoset acrylic polymer primer layer by flow coating the panels with a primer emulsion composition containing 10% of thermosettable acrylic solids containing 0.3% toluene sulfonic acids (these solids are provided by Rhoplex AC-658), 35% butoxyethanol and 65% water. The test panels are drained for 15 minutes and are then heated for one hour at 125° C. to cure the thermosettable acrylic polymer to a thermoset acrylic polymer.

A colloidal silica filled thermoset organopolysiloxane top coat is applied onto the primed test panels by flow coating the primed panels with a top coat composition comprised of about 18% solids, about 50% of these solids being colloidal silica and about 50% of these solids being the partial condensation product of $CH_3Si(OH)_3$, in a lower aliphatic alcohol-water system, and having a pH of about 3.9. The panels coated with this top coat composition are drained for 30 minutes and are then baked at 125° C. for one hour to cure the further curable organopolysiloxane to a thermoset stage.

The test panels prepared in Examples 1–7 are then tested for initial adhesion of the top coat and for adhesion of the top coat after aging under RS-sunlamps and in a QUV accelerated weathering device. The results of these tests are set forth in Table I. The adhesion test consists of using a multiple blade tool to cut parallel grooves about 1 mm. apart through the coating into the substrate, rotating the sample 90° and repeating the cutting process thereby forming a grid pattern of 1 mm. squares cut into the coating, and applying an adhesive tape over the cross-hatched area and quickly pulling the tape off. A sample fails the adhesion test if any of the squares in the grid are pulled off. In the RS-sunlamp aging test the samples undergo severe exposure to ultraviolet radiation. In this test the samples are exposed to a RS-sunlamp and during exposure are periodically removed and subjected to the adhesion test. In the QUV accelerated weathering test the samples are inserted into a QUV accelerated weathering device sold by the Q-Panel Company. This device is set to alternating consecutive cycles of fluorescent ultraviolet light at 60° C. for 4 hours and high humidity at 45° C. for 4 hours. The test samples are periodically removed from the QUV accelerated weathering device and subjected to the adhesion test.

TABLE I

| Example No. | Initial Adhesion | No. of Hours of Exposure to RS-Sunlamp at which Sample Fails the Adhesion Test | No. of Hours of Exposure in QUV Weathering Device at which Sample Fails the Adhesion Test |
|---|---|---|---|
| 1 | Pass | Passes after 323 hours | Passes after 329 hours |
| 2 | Pass | Passes after 323 hours | Passes after 329 hours |
| 3 | Pass | Passes after 323 hours | Passes after 329 hours |
| 4 | Pass | Passes after 323 hours | Passes after 209 hours, Fails at 329 hours |
| 5 | Pass | Passes after 323 hours | Passes after 209 hours, Fails at 329 hours |
| 6 | Pass | Passes after 323 hours | Passes after 329 hours |
| 7 | Pass | Passes after 323 hours | Passes after 329 hours |

EXAMPLE 8

The surface layers of a polycarbonate film 2"×4"×1/100" are impregnated with an ultraviolet radiation absorbing compound by flow coating the film with an ultraviolet radiation stabilizing composition comprised of a solution of 1% Cyasorb UV-1988 dissolved in butoxyethanol. The coated film is drained for less than one minute and then heated at 125° C. for five minutes. The treated film is placed in the sample beam of a Perkin-Elmer Model Coleman 575 Spectrophotometer and an untreated film is placed in the reference. The absorbance of the treated film was measured, and the amount of ultraviolet light absorbed by the treated film is calculated using the relationship $A = \log (I_o/I)$ where A is the absorbance, $I_o$ is the intensity of incident ultraviolet light, and I is the intensity of transmitted ultraviolet light. The results are set forth in Table II.

EXAMPLE 9

An ultraviolet radiation stabilized film is prepared substantially in accordance with the procedure of Example 8 except that the ultraviolet radiation stabilizing composition contains 2% Cyasorb UV-1988. Absorbance of this film is determined according to the procedure of Example 8 and the results are set forth in Table II.

EXAMPLE 10

An ultraviolet radiation stabilized polycarbonate film is prepared substantially in accordance with the procedure of Example 8 except that the ultraviolet radiation stabilizing composition contains 3% of Cyasorb UV-1988. Absorbance of this film is determined according to the procedure of Example 8 and the results are set forth in Table II.

EXAMPLE 11

An ultraviolet radiation stabilized polycarbonate film is prepared substantially in accordance with the procedure of Example 8 except that the ultraviolet radiation stabilizing composition contains 1% of 2,2',4,4'-tetrahydroxybenzophenone. Absorbance of this film is determined according to the procedure of Example 8 and the results are set forth in Table II.

EXAMPLE 12

An ultraviolet radiation stabilized polycarbonate film is prepared substantially in accordance with the procedure of Example 8 except that the ultraviolet radiation stabilizing composition contains 2% of 2,2',4,4'-tetrahydroxybenzophenone. Absorbance of this film is determined according to the procedure of Example 8 and the results are set forth in Table II.

EXAMPLE 13

An ultraviolet radiation stabilized polycarbonate film is prepared substantially in accordance with the procedure of Example 8 except that the ultraviolet radiation stabilizing composition contains 3% of 2,2',4,4'-tetrahydroxybenzophenone. Absorbance of this film is determined according to the procedure of Example 8 and the results are set forth in Table II.

TABLE II

| Example Number | Absorbance at λmaximum | % UV-light Absorbed at λmaximum |
|---|---|---|
| 8 | 1.17 | 93% |
| 9 | 2.64 | >99% |
| 10 | >3 | >99.9% |
| 11 | 0.87 | 88% |
| 12 | 1.77 | 98% |
| 13 | 2.61 | >99% |

EXAMPLE 14

A first ultraviolet radiation stabilized, primed and top coated polycarbonate test panel is prepared substantially in accordance with the procedure of Example 1 except that the ultraviolet radiation stabilizing composition contains 6% of Cyasorb 5411 (a derivative of benzotriazole ultraviolet light absorber marketed by American Cyanimid Co.) and the drained panel is heated at 125° C. for 10 minutes rather than for 5 minutes. A second primed and top coated, but not ultraviolet radiation stabilized, polycarbonate test panel is prepared substantially in accordance with the procedure of Example 7. Both of these test panels are exposed to ultraviolet light aging under a RS-sunlamp system for five days. At the end of five days both test panels are visually inspected. The first test panel is found to be colorless while the second test panel is visibly yellow.

It is clear from the data in Table I that the initial adhesion and the adhesion after exposure to weathering of the colloidal silica filled silicone top coat to the ultraviolet radiation surface stabilized polycarbonate articles of the present invention, i.e., Examples 1–6, is comparable to that of the prior art polycarbonate articles which do not contain an ultraviolet radiation absorber dispersed in their surface layers, i.e., Example 7. This is rather surprising as it is well known that modification of the surface of a polycarbonate resin by the inclusion therein of an additive produces unexpected and unpredictable effects on the adhesion of a coating thereto. These effects are oftentimes negative in that the adhesion, both initial and after exposure to weathering, but particularly the adhesion after exposure to weathering, of the coating to the treated polycarbonate surface is adversely affected. As clearly illustrated by Example 14 the articles of the present invention not only possess good adhesion of the colloidal silica filled thermoset organoplysiloxane top coat to the ultraviolet radiation surface stabilized polycarbonate substrate, but are also resistant to degradation by ultraviolet radiation. The prior art articles, as typified by the second polycarbonate test panel in Example 14, while possessing good adhesion of the colloidal silica filled thermoset organopolysiloxane top coat to the polycarbonate substrate are quite susceptible to degradation by ultraviolet radiation.

Table II illustrates the fact that treating polycarbonate resins with the preferred ultraviolet radiation stabilizing composition, i.e., a composition containing an ultraviolet radiation absorbing compound and a nonaggressive liquid carrier therefore, results in a resin whose surface areas absorb the great majority of incident ultraviolet radiation. This protection against ultraviolet radiation is achieved without any visible deleterious effects on the surface of the treated polycarbonate resin.

While one particularly preferred colloidal silica filled further curable organopolysiloxane top coat composition has been described in detail hereinbefore, this is not the only type of colloidal silica filled further curable organopolysiloxane top coat composition which can be utilized in producing the colloidal silica filled thermoset organopolysiloxane top coat of the present invention. Another colloidal silica filled further curable organopolysiloxane containing top coat composition which might be used is that described in U.S. Pat. No. 4,159,206. This composition comprises about 30–50 parts by weight of a colloidal silica and about 50–70 parts by weight of (i) dialkyldialkoxysilane and (ii) alkyltrialkoxysilane wherein the weight ratio of (i) to (ii) is from about 1:19 to about 1:4.

In this composition the silanes generate the corresponding silanols in situ by the addition of the corresonding di- and trialkoxysilanes to the acidic aqueous dispersions of colloidal silica. The resulting composition comprises a dispersion of colloidal silica in the lower aliphatic alcohol-water solution of the partial condensate of a mixture of silanols, one having the formula $R^6Si(OH)_3$ and one having the formula $R^7R^6Si(OH)_3$ in which $R^6$ and $R^7$ are selected independently from the group consisting of alkyl radicals of 1 to 3 inclusive carbon atoms, the vinyl radical, the 3,3,3-trifluoropropyl radical, the gamma-glycidoxypropyl radical, the gamma-acryloxypropyl radical, and the gamma-methacryloxypropyl radical, said composition containing 10 to 50 weight percent solids, the ratio of colloidal silica to the partial condensate being from 1:1 to about 3:7 by weight, said composition further containing sufficient acid to provide a pH in the range of 3.0 to 6.0.

The nonvolatile solids portion of this coating composition is a mixture of colloidal silica and the partial condensate of a mixture of silanols. The silanols are generated in situ by hydrolysis of the corresponding mixture of (i) dialkyldialkoxysilane and (ii) alkyltrialkoxysilane. The weight ratio of (i) to (ii) is from about 1:19 to about 1:4. Suitable dialkoxy and trialkoxysilanes are those containing methoxy, ethoxy, isopropoxy and t-butoxy substituents, which upon hydrolysis liberate the corresponding alcohol, thereby generating at least a portion of the alcohol present in the composition. Upon generation of the silanol in the acidic aqueous medium, there is condensation of the hydroxyl substituents to form —Si—O—Si— bonding. The condensation is not complete, but rather the siloxane retains an appreciable quantity of silicon-bonded hydroxyl groups, thus rendering the polymer soluble in the water-alcohol solvent. This soluble partial condensate can be characterized as a siloxanol polymer having at least one silicon-bonded hydroxyl group per every three —SiO— units.

Upon curing there is further condensation of the silanols and cross linking of the polymer to form a thermoset organopolysiloxane.

From the foregoing it is quite evident that the instant invention provides both articles and a method of producing these articles which are resistant to degradation by ultraviolet light, abrasion and attack by chemical solvents and which retain all of the desirable and excellent physical and chemical properties of unstabilized and uncoated polycarbonate resin.

The foregoing disclosure of this invention is not to be considered as limiting, since many variations may be made by those skilled in the art without departing from the scope or spirit of the foregoing description.

What I claim as new and desire to secure by Letters Patent of the United States is:

1. An improved coated polycarbonate article exhibiting improved resistance to degradation by ultraviolet radiation comprising a polycarbonate substrate having durably adhered on at least one surface thereof a coating comprised of (i) an adhesion promoting primer layer containing a thermoset acrylic polymer disposed on said surface, and (ii) adherently disposed on said primer layer a top coat layer containing a colloidal silica filled thermoset organopolysiloxane; the improvement consisting essentially of said polycarbonate surface on which said coating is disposed being impregnated with at least one ultraviolet radiation absorbing compound.

2. The article of claim 1 wherein said top coat layer contains from about 10 to about 70 weight percent of colloidal silica.

3. The article of claim 2 wherein said top coat layer contains from about 30 to about 70 weight percent of the condensation product of at least one silanol.

4. The article of claim 3 wherein said silanol is selected from the group represented by the formula $R^5Si(OH)_3$ wherein $R^5$ is selected from the group consisting of alkyl radicals, the vinyl radical, the 3,3,3-trifluoropropyl radical, the gamma-glycidoxypropyl radical, and the gamma-methacryloxypropyl radical.

5. The article of claim 4 wherein at least 70 weight percent of said silanol is $CH_3Si(OH)_3$.

6. The article of claim 5 wherein said silanol is $CH_3Si(OH)_3$.

7. The article of claim 1 wherein said ultraviolet radiation absorbing compound is selected from the group consisting of benzophenone derivatives, benzotriazole derivatives, benzylidene malonates, and cyanoacrylates.

8. The article of claim 5 wherein said ultraviolet radiation absorbing compound is selected from the group consisting of benzophenone derivatives, benzotriazole derivatives, benzylidene malonates, and cyanoacrylates.

9. The article of claim 8 wherein said benzylidene malonates are represented by the formula

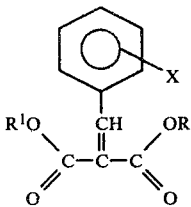

wherein X is selected from hydrogen, hydroxyl, halogen, alkyl, and alkoxy radicals; and R and $R^1$ are independently selected from alkyl, substituted alkyl, aryl, substituted aryl, alkaryl, and aralkyl radicals.

10. The article of claim 8 wherein said cyanoacrylates are selected from compounds represented by the formula

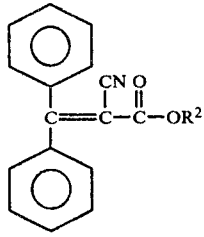

wherein $R^2$ is an alkyl or a hydroxyalkyl radical.

11. The article of claim 8 wherein said polycarbonate resin substrate is non-opaque.

12. An improved coated polycarbonate article exhibiting improved resistance to degradation by ultraviolet radiation comprising a polycarbonate resin substrate having disposed on at least one surface thereof (i) an adhesion promoting primer layer containing a thermoset acrylic polymer disposed adherently on said surface; and (ii) adherently disposed on said primer layer a top coat layer containing the cured product of a top coat composition comprised of a dispersion of colloidal silica in a lower aliphatic alcohol-water solution of the partial condensate of at least one silanol, said top coat composition containing from about 10 to about 50 weight percent solids consisting essentially of from about 10 to about 70 weight percent of colloidal silica and from about 30 to about 90 weight percent of said partial condensate; the improvement consisting essentially of said polycarbonate surface on which said primer layer and said top coat layer are disposed being impregnated with at least one ultraviolet radiation absorbing compound.

13. The article of claim 12 wherein said silanol is selected from the group represented by the formula $R^5Si(OH)_3$ wherein $R^5$ is selected from alkyl radicals, the vinyl radical, the 3,3,3-trifluoropropyl radical, the gamma-glycidoxypropyl radical, and the gamma-methacryloxypropyl radical.

14. The article of claim 1 wherein at least 70 percent by weight of said silanol is $CH_3Si(OH)_3$.

15. The article of claim 1 wherein said top coat composition contains sufficient acid to provide a pH in the range of 3.0 to 6.0.

16. The article of claim 15 wherein said silanol is $CH_3Si(OH)_3$.

17. The article of claim 12 wherein said ultraviolet radiation absorbing compound is selected from the group consisting of benzophenone derivatives, benzotriazole derivatives, benzylidene malonates, and cyanoacrylates.

18. The article of claim 15 wherein said ultraviolet radiation absorbing compound is selected from the group consisting of benzophenone derivatives, benzotriazole derivatives, benzylidene malonates, and cyanoacrylates.

19. The article of claim 1 wherein said benzylidene malonates are represented by the formula

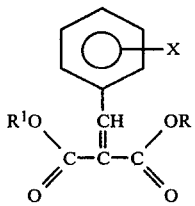

wherein X is selected from hydrogen, hydroxyl, halogen, alkyl, and alkoxy radicals, and R and $R^1$ are independently selected from alkyl, substituted alkyl, aryl, substituted aryl, alkaryl, and aralkyl radicals.

20. The article of claim 1 wherein said cyanoacrylates are represented by the formula

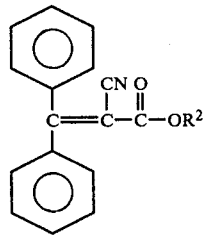

wherein $R^2$ is an alkyl or a hydroxyalkyl radical.

21. The article of claim 18 wherein said polycarbonate resin substrate is non-opaque.

22. An improved coated polycarbonate article exhibiting improved resistance to degradation by ultraviolet radiation comprising a polycarbonate resin substrate having disposed on at least one surface thereof (i) an adhesion promoting primer layer containing a thermoset acrylic polymer disposed adherently on said surface; and (ii) a top coat composition disposed on said primer layer, said top coat composition comprised of a dispersion of colloidal silica in a lower aliphatic alcohol-water solution of the partial condensate of at least one silanol, said composition containing from about 10 to about 50 weight percent solids consisting essentially of from about 10 to about 70 weight percent colloidal silica and from about 30 to about 90 weight percent of said partial condensate; said improvement consisting essentially of said polycarbonate surface on which said primer layer and said top coat composition are disposed being impregnated with at least one ultraviolet radiation absorbing compound.

23. The article of claim 22 wherein said silanol has the formula $R^5Si(OH)_3$ wherein $R^5$ is selected from alkyl radicals, the vinyl radical, the 3,3,3-trifluoropropyl radical, the gamma-glycidoxypropyl radical, and the gamma-methacryloxypropyl radical.

24. The article of claim 23 wherein at least about 70 weight percent of said silanol is $CH_3Si(OH)_3$.

25. The article of claim 1 wherein said top coat composition contains sufficient acid to provide a pH in the range of from 3.0 to 6.0.

26. The article of claim 1 wherein said silanol is $CH_3Si(OH)_3$.

27. The article of claim 1 wherein said ultraviolet radiation absorbing compound is selected from the group consisting of benzophenone derivatives, benzotriazole derivatives, benzylidene malonates, and cyanoacrylates.

28. The article of claim 1 wherein said ultraviolet radiation absorbing compound is selected from the group consisting of benzophenone derivatives, benzotriazole derivatives, benzylidene malonates, and cyanoacrylates.

29. The article of claim 1 wherein said benzylidene malonates are represented by the formula

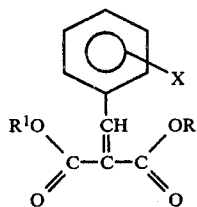

wherein X is selected from hydrogen, hydroxyl, halogen, alkyl, and alkoxy radicals; and R and $R^1$ are independently selected from alkyl, substituted alkyl, aryl, substituted aryl, alkaryl, and aralkyl radicals.

30. The article of claim 1 wherein said cyanoacrylates are represented by the formula

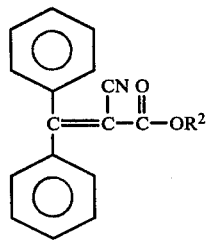

wherein $R^2$ is an alkyl or a hydroxyalkyl radical.

31. The article of claim 1 wherein said polycarbonate resin substrate is non-opaque.

32. A polycarbonate article exhibiting superior resistance to degradation by ultraviolet radiation, abrasion resistance, and resistance to attack by chemical solvents produced by the process of:
(i) impregnating the surface layers of a polycarbonate resin substrate with at least one ultraviolet radiation absorbing compound by contacting said surface with an ultraviolet radiation stabilizing composition containing at least one ultraviolet radiation absorbing compound and a nonaggressive liquid carrier therefor for a period of time and at a temperature effective for said ultraviolet radiation absorbing compound to impregnate the surface layers in a concentration effective to provide protection against degradation by ultraviolet radiation;
(ii) applying onto said impregnated surface a primer emulsion composition containing, in percent by weight, (a) from about 1 to about 10 percent of a thermosettable acrylic polymer, (b) from about 20 to about 45 percent of a hydroxy ether, an alkanol, or a mixture thereof, and (c) from about 45 to about 79 percent of water;
(iii) evaporating off a substantial portion of the liquid components present in said primer emulsion composition to form a thin substantially solid layer comprised of a thermosettable acrylic polymer;
(iv) thermally curing said thermosettable acrylic polymer to form a thermoset acrylic polymer;
(v) applying onto said cured primer layer a top coat composition comprising a dispersion of colloidal silica in a lower aliphatic alcohol-water solution of the partial condensate of at least one silanol, said composition containing from about 10 to about 50 weight percent solids consisting essentially of from about 10 to about 70 weight percent colloidal silica and from about 30 to about 90 weight percent of said partial condensate;
(vi) evaporating off a substantial portion of the volatile liquids present in said top coat composition thereby forming a substantially solid layer comprised of a colloidal silica filled partial condensate of at least one silanol; and
(vii) thermally curing said partial condensate thereby forming a colloidal silica filled thermoset organopolysiloxane containing top coat.

33. The article of claim 1 wherein said silanol has the formula $R^5Si(OH)_3$ wherein $R^5$ is selected from alkyl radicals, the vinyl radical, the 3,3,3-trifluoropropyl radical, the gamma-glycidoxypropyl radical, and the gamma-methacryloxypropyl radical.

34. The article of claim 1 wherein at least 70 weight percent of said silanol is $CH_3Si(OH)_3$.

35. The article of claim 1 wherein said top coat composition contains sufficient acid to provide a pH in the range from 3.0 to 6.0.

36. The article of claim 1 wherein said silanol is $CH_3Si(OH)_3$.

37. The article of claim 35 wherein the nonaggressive liquid carrier present in the ultraviolet radiation stabilizing composition is selected from the group consisting of hydroxy ethers, alcohols, alcohol-water mixtures, liquid aliphatic hydrocarbons, liquid cycloaliphatic hydrocarbons, and chlorofluorocarbons.

38. The article of claim 1 wherein the polycarbonate resin substrate is preheated to a temperature between about 65° C. and about 150° C. and the ultraviolet radiation stabilizing composition is applied onto the preheated polycarbonate resin substrate.

39. The article of claim 1 wherein said ultraviolet radiation absorbing compound is selected from the group consisting of benzophenone derivatives, benzotriazole derivatives, benzylidene malonates, and cyanoacrylates.

40. The article of claim 1 wherein the ultraviolet radiation stabilizing composition is applied onto the surface of the polycarbonate resin substrate and the coated substrate is then heated to a temperature between about 65° C. and about 150° C.

41. The article of claim 1 wherein said ultraviolet radiation ion absorbing compound is selected from the group consisting of benzophenone derivatives, benzotriazole derivatives, benzylidene malonates, and cyanoacrylates.

42. The article of claim 1 wherein the nonaggressive liquid carrier in the ultraviolet radiation stabilizing composition is selected from the group consisting of hydroxy ethers, alcohols, alcohol-water mixtures, liquid aliphatic hydrocarbons, liquid cycloaliphatic hydrocarbons, and chlorofluorocarbons.

43. The article of claim 1 wherein the polycarbonate resin substrate is preheated to a temperature between about 65° C. and about 150° C. and the ultraviolet radiation stabilizing composition is applied onto the surface of the preheated polycarbonate resin substrate.

44. the article of claim 1 wherein said ultraviolet radiation absorbing compound is selected from the group consisting of benzophenone derivatives, benzotriazole derivatives, benzylidene malonates, and cyanoacrylates.

45. The article of claim 1 wherein the ultraviolet radiation stabilizing composition is applied onto the surface of the polycarbonate resin substrate and the coated substrate is then heated to a temperature between about 65° C. and about 150° C.

46. The article of claim 1 wherein said ultraviolet radiation absorbing compound is selected from the group consisting of benzophenone derivatives, benzotriazole derivatives, benzylidene malonates, and cyanoacrylates.

* * * * *